UNITED STATES PATENT OFFICE.

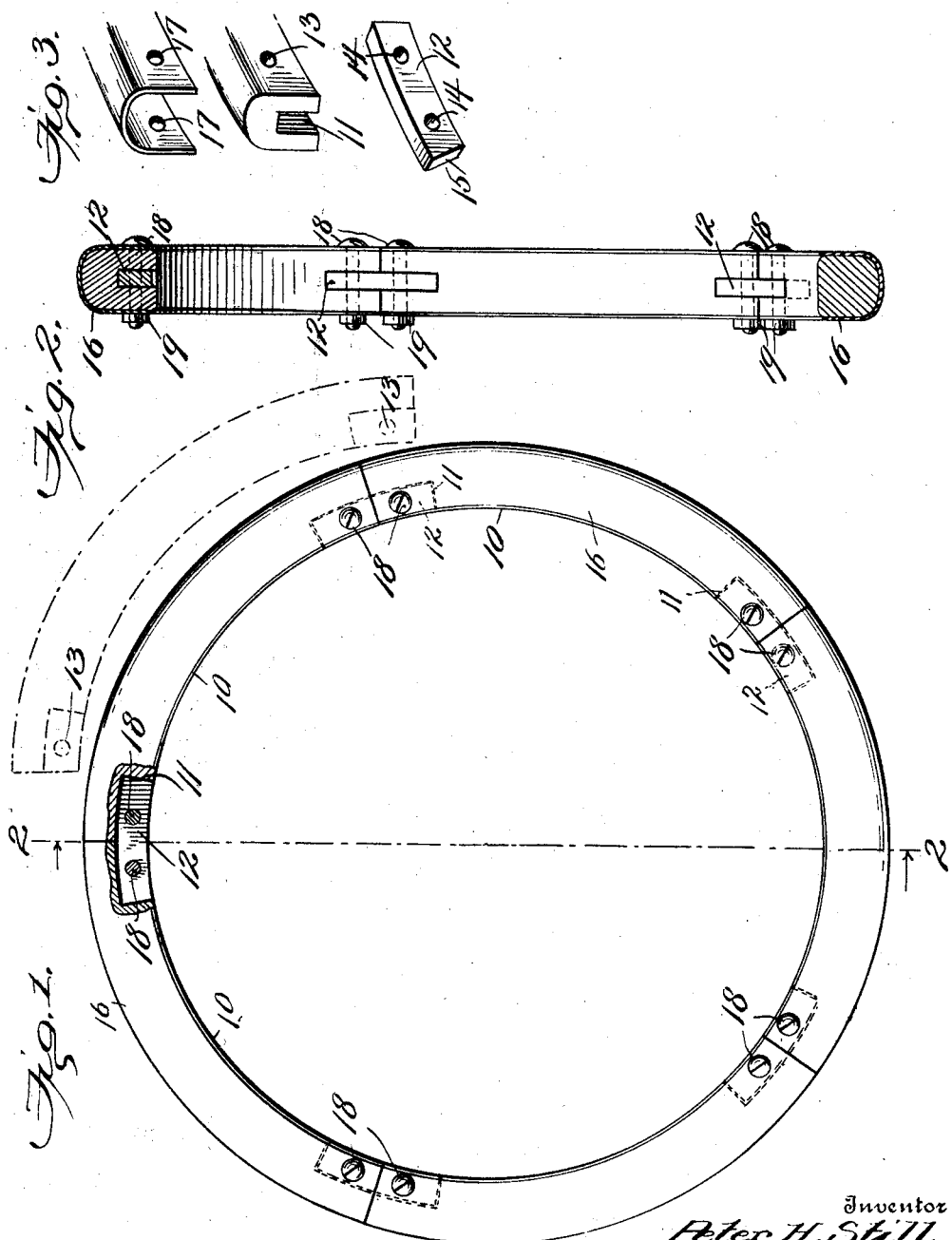

PETER H. STILL, OF OMAHA, NEBRASKA, ASSIGNOR OF ONE-HALF TO ALBERT S. BROWN, OF OMAHA, NEBRASKA.

EMERGENCY-TIRE.

1,356,414. Specification of Letters Patent. Patented Oct. 19, 1920.

Application filed June 7, 1920. Serial No. 387,054.

*To all whom it may concern:*

Be it known that I, PETER H. STILL, a citizen of the United States, residing at Omaha, in the county of Douglas and State of Nebraska, have invented new and useful Improvements in Emergency-Tires, of which the following is a specification.

This invention relates to emergency tires for vehicles, and more specifically to a tire of the type which is composed of a plurality of sections detachably secured together, whereby it may be carried in a limited space within the vehicle and readily and rapidly applied when necessary.

The sections of the tire are preferably made of some resilient material, such as wood reinforced by a wear resisting and reinforcing member, preferably composed of metal such as galvanized iron. This reinforcing member will retain the tire in shape and prevent warping, cracking or splitting of the same.

Other objects of my invention and novel details of construction of my improved tire will become apparent on reference to the following specification which describes the invention in connection with the accompanying drawing.

In the drawing:—

Figure 1 is a plan view of my invention with parts in section showing the sections secured together so as to form a complete annular tire. This figure also shows a detached view of one of the sections.

Fig. 2 is a sectional view on the line 2—2 of Fig. 1.

Fig. 3 shows a plurality of perspective views showing the U-shaped member, part of a tire section and the connecting link.

The numeral 10 designates one of the sections of my improved tire, and inasmuch as the sections are of like construction a description of one of them will suffice for an understanding of all. Each section which is preferably made of wood is provided with inner terminal recesses 11, which are adapted to register with corresponding recesses in the next adjacent sections. The end walls of these recesses are preferably cut radially with regard to the final diameter of the complete annular tire, and are also made of such dimensions as to leave a slight clearance about the edges of the connecting links 12, which are inserted within them. The U-shaped wear resisting member 16 is placed over the outer periphery of each of the sections with its sides snugly fitting the side walls of the tire. This wear resisting and reinforcing member 16 is preferably made of galvanized iron and is pressed firmly upon each of the sections 10. Each section of the tire, the links 12 and the U-shaped member 16 are provided respectively with alining transverse apertures 13, 14 and 17 respectively. The edges 15 of the links 12 are also cut radially so as to be substantially parallel to the end walls of the recesses 11. The slight play allowed between the connecting links and the walls of the recesses 11 is for the purpose of allowing the tire a slight adjustment, whereby it may conform to any slight irregularities in the rim of the vehicle wheel. Fastening devices comprising the bolts 18 and detachable nuts 19 are inserted through the alining apertures 13, 14 and 17 in order to detachably secure the sections of the tire together.

Assuming the vehicle wheel has a clencher rim, the emergency tire is applied thereto by first detaching a few of the sections and applying the remainder about the rim, and then again securing the sections which were removed in place. The inner dimension of the sections of the tire, when in assembled form, is such that the tire engages the rim of the vehicle wheel with a frictional force sufficient to insure against its relative movement. In case of a demountable rim the tire may be applied in the same manner as ordinary pneumatic tires, by collapsing the rim and then expanding the same against the tire. However, this procedure is not easily accomplished with the equipment usually available on the road, and in order to prevent running on the rim the tire may be tightly applied directly to the rim of the wheel, in the same manner as above described for a clencher rim.

I claim—

1. A tire composed of a plurality of arcuate sections, a U-shaped member extending over the outer periphery of each section, connecting links for said sections, and fastening means for adjacent sections adapted to engage said sections, U-shaped members and one of said links.

2. A tire composed of a plurality of arcuate sections, each section having terminal recesses adapted to register with corresponding recesses in the next adjacent sections, connecting links in said registering recesses, said sections and links having alining transverse apertures therethrough, and fastening means passing through said apertures for detachably securing said sections to the links.

3. A tire composed of a plurality of arcuate sections, each section having terminal recesses adapted to register with corresponding recesses in the next adjacent sections, a U-shaped member extending over the outer periphery and embracing the sides of each section, connecting links in said registering recesses, said sections, links and U-shaped members having alining transverse apertures therethrough, and detachable fastening means passing through said apertures.

4. An emergency tire composed of a plurality of wooden sections, a metal wear resisting member embracing the outer periphery and sides of each section and means for detachably connecting said sections together, said means including fastening devices passing transversely through said member and each wooden section.

5. A tire composed of a plurality of arcuate sections, a member extending over the outer periphery of each section and secured thereto, connecting links for said sections, and fastening means for adjacent sections adapted to connect said sections with one of said links.

In testimony whereof I have hereunto set my hand in presence of two subscribing witnesses.

PETER H. STILL.

Witnesses:
 GEORGE H. MERTEN,
 HARRY ENGLEHAUPT.